UNITED STATES PATENT OFFICE 2,735,849

ANTHRAQUINONE TRIAZINE VAT DYESTUFFS

Friedrich Ebel, Mannheim-Feudenheim, Walter Rupp, Ludwigshafen (Rhine-Oppau), and Walter Keller, Ludwigshafen (Rhine), Germany, assignors to Badische Anilin & Soda-Fabrik Aktiengesellschaft, Ludwigshafen (Rhine), Germany No Drawing. Application May 27, 1954,
Serial No. 432,930

6 Claims. (Cl. 260—249)

This invention relates to vat dyestuffs of the anthraquinone series, in particular to amide like compounds of 1.4-diamino-2-acetylanthraquinone.

We have found that valuable vat dyestuffs are obtained when 1 mol of a 2-phenyl-4.6-dichlor-1.3.5 triazine is condensed with 2 mols of 1.4-diamino-2-acetylanthraquinone. Said triazines may contain in the phenyl nucleus one or two chlorine atoms or a methyl group of a methoxy group.

The reaction is preferably effected by heating the components in an inert solvent of high boiling point until no more hydrogen halide escapes e. g. in nitrobenzene, dichlorbenzene or trichlorbenzene. The co-employment of an acid-binding agent, such as potash, sodium acetate, sodium sulfite or pyridine, is generally speaking unnecessary but their addition may be of advantage in some cases. The reaction temperature lies between 70° and 250° C., generally between 120° and 210° C.

The relative proportions are chosen so that only the amino group on the 4-position of the 1.4-diamino-2-acetylanthraquinone reacts with the 2-phenyl-4.6-dichlor-1.3.5-triazine. This is the case when 1 mol of the 2-phenyl-4.6-dichlor-1.3.5-triazine is heated with 2 mols of 1.4-diamino-2-acetylanthraquinone.

The dyestuffs obtained dye natural and regenerated cellulose, and also polyamide fibers from the vat in uniform blue shades of high fastness properties.

The following examples will further illustrate this invention but the invention is not restricted to these examples. The parts are by weight.

Example 1

A mixture of 28 parts of 1.4-diamino-2-acetylanthraquinone and 600 parts of nitrobenzene is heated to 100° C. and 11 parts of 2-phenyl-4.6-dichlor-1.3.5-triazine are then added. The temperature of the mixture is slowly raised to 170° C., while stirring and maintained for 2 hours. The reaction mixture is then allowed to cool, the separated dyestuff is filtered off by suction, washed with methanol and dried at 80° C. There are obtained 29.6 parts of a blue microcrystalline powder which dyes cotton or regenerated cellulose or polyamide fibers reddish blue shades from a black-red vat. The new dyestuff dissolves in concentrated sulfuric acid giving a green-brown coloration.

Example 2

Into 600 parts of dry nitrobenzene, there are introduced 34 parts of 1.4-diamino-2-acetylanthraquinone and 15.6 parts of 2-(4'-chlorphenyl)-4.6-dichlor-1.3.5-triazine and the mixture is slowly heated to 170° C. while stirring. After stirring the mixture for further 2 hours at this temperature, it is allowed to cool. The separated dyestuff is filtered off by suction, washed well with methanol and dried. There are obtained 36 parts of a blue microcrystalline powder, which dissolves in concentrated sulfuric acid giving a brown coloration and which dyes cotton, regenerated cellulose, and polyamide fibers strong reddish-blue shades from a deep red vat.

Example 3

A mixture of 28 parts of 1.4-diamino-2-acetylanthraquinone, 12 parts of 2-(3'-methylphenyl)-4.6-dichlor-1.3.5-triazine and 500 parts of nitrobenzene is slowly heated to 170° C. while stirring and this temperature maintained for 2 hours. After cooling the separated dyestuff is filtered off by suction, washed well with methanol and dried. There are obtained 26 parts of a blue microcrystalline powder, which dissolves in concentrated sulfuric acid giving a greenish-brown coloration and which dyes cotton, regenerated cellulose, or polyamide fibers blue shades from a nearly black vat.

If 12 parts of 2-(4'-methylphenyl)-4.6-dichlor-1.3.5-triazine instead of the 3'-isomer are employed there are obtained 28.5 parts of a blue vat dyestuff.

Example 4

A mixture of 28 parts of 1.4-diamino-2-acetylanthraquinone, 12.8 parts of 2-(2'-methoxyphenyl)-4.6-dichlor-1.3.5-triazine and 500 parts of nitrobenzene is slowly heated to 170° C. and this temperature is maintained for 2 hours. After cooling the separated dyestuff is filtered off by suction, washed with methanol and dried. There are obtained 28 parts of a blue powder which dissolves in concentrated sulfuric acid giving a greenish-brown coloration and which dyes cotton, regenerated cellulose or polyamide fibers blue shades from a black-red vat.

Example 5

A mixture of 28 parts of 1.4-diamino-2-acetylanthraquinone, 12.8 parts of 2-(3'-methoxyphenyl)-4.6-dichlor-1.3.5-triazine and 500 parts of nitrobenzene is slowly heated to 170° C. and this temperature is maintained for 2 hours. After cooling the separated dyestuff is filtered off by suction, washed with methanol and dried. There are obtained 28 parts of a blue powder which dissolves in concentrated sulfuric acid giving a greenish-brown coloration and which dyes cotton, regenerated cellulose or polyamide fibers blue shades from a black-red vat.

Example 6

A mixture of 28 parts of 1.4-diamino-2-acetylanthraquinone, 12.8 parts of 2-(4'-methoxyphenyl)-4.6-dichlor-1.3.5-triazine and 500 parts of nitrobenzene is slowly heated to 170° C. and this temperature is maintained for 2 hours. After cooling the separated dyestuff is filtered off by suction, washed with methanol and dried. There are obtained 28 parts of a blue powder which dissolves in concentrated sulfuric acid giving a greenish-brown coloration and which dyes cotton, regenerated cellulose or polyamide fibers blue shades from a black-red vat.

Example 7

A mixture of 29 parts of 1.4-diamino-2-acetylanthraquinone, 14.7 parts of 2-(2'.4'-dichlorphenyl)-4.6-dichlor-1.3.5-triazine and 500 parts of nitrobenzene is slowly heated to 170° C. while stirring and this temperature is maintained for 2 hours. After cooling the separated dyestuff is filtered off by suction, washed with methanol and dried. There are obtained 35.5 parts of a blue microcrystalline powder which dissolves in concentrated sulfuric acid giving a greenish brown coloration and which dyes cotton, regenerated cellulose and polyamide fibers from a black-red vat blue shades with good fastness properties.

What we claim is:
1. A vat dyestuff of the general formula

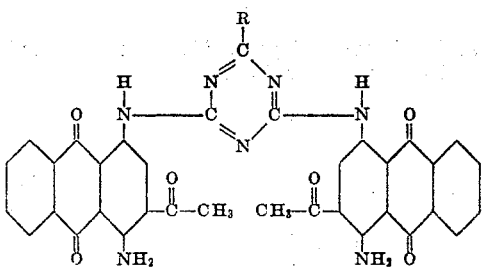

wherein R stands for a radical selected from the class consisting of phenyl, 3'-methylphenyl, 4'-methylphenyl, 2'-methoxyphenyl, 3'-methoxyphenyl, 4'-methoxyphenyl, 4'-chlorphenyl and 2'4'-dichlorphenyl.

2. The vat dyestuff of the formula

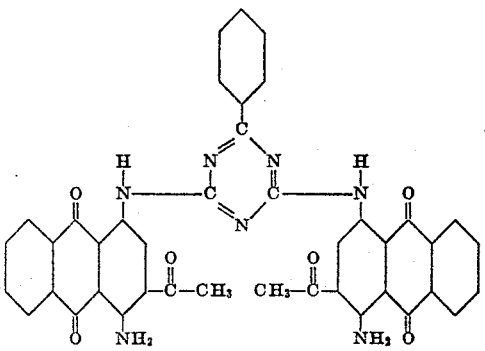

3. The vat dyestuff of the formula

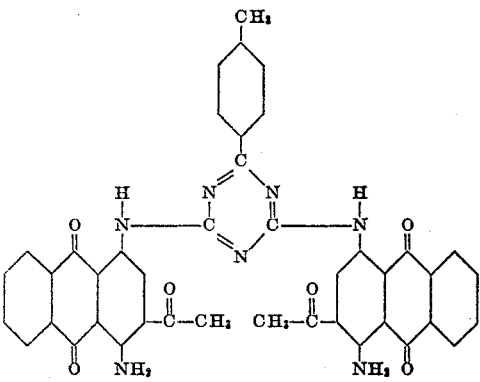

4. The vat dyestuff of the formula

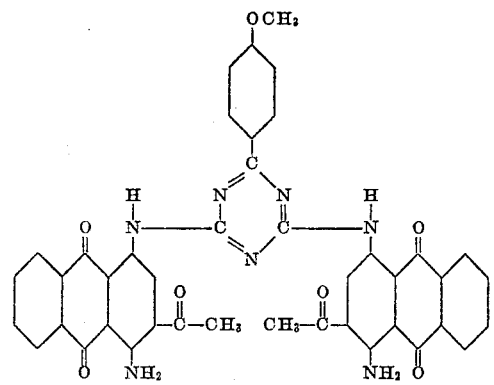

5. The vat dyestuff of the formula

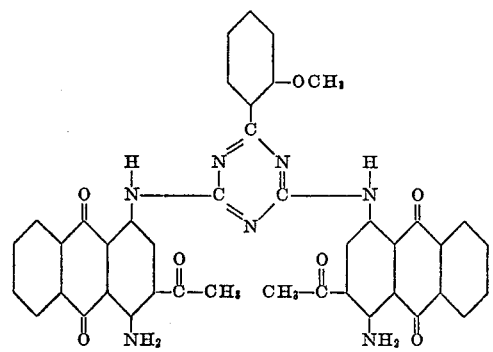

6. The vat dyestuff of the formula

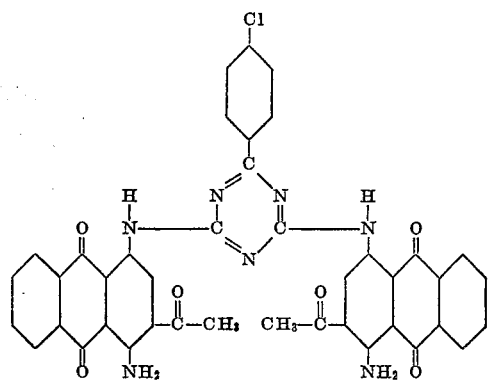

References Cited in the file of this patent
UNITED STATES PATENTS

| | | |
|---|---|---|
| 1,987,747 | Nawiasky | Jan. 15, 1935 |
| 1,994,602 | Weiner | Mar. 19, 1935 |
| 2,299,141 | Hauser | Oct. 20, 1942 |
| 2,691,020 | Gadea | Oct. 5, 1954 |

FOREIGN PATENTS

| | | |
|---|---|---|
| 449,477 | Great Britain | June 24, 1946 |